United States Patent [19]

Reimers et al.

[11] 4,435,302

[45] Mar. 6, 1984

[54] CONCENTRATING AND RECLAIMING MAGNETIC FLUIDS

[75] Inventors: George W. Reimers, Burnsville; Sanaa E. Khalafalla, Minneapolis, both of Minn.

[73] Assignee: The United States of America as represented by the Secretary of the Interior, Washington, D.C.

[21] Appl. No.: 383,060

[22] Filed: May 28, 1982

[51] Int. Cl.[3] .......................... H01F 1/25; H01F 1/00; C10M 3/00; C09D 11/00

[52] U.S. Cl. ............................... 252/62.51; 252/62.52

[58] Field of Search ..................... 252/62.51 R, 62.52, 252/62.53, 67.54

[56] References Cited

U.S. PATENT DOCUMENTS

| | | | |
|---|---|---|---|
| 3,531,413 | 9/1970 | Rosensweig | 252/62.62 |
| 3,917,538 | 11/1975 | Rosensweig | 252/62.51 |
| 4,094,804 | 6/1978 | Shimoiizaka | 252/62.52 |
| 4,208,294 | 6/1980 | Khalafalla et al. | 252/62.52 |

*Primary Examiner*—F. Edmundson
*Attorney, Agent, or Firm*—William S. Brown; Donald A. Gardiner

[57] ABSTRACT

Concentration and reclaiming of magnetic fluids is accomplished by (1) flocculation of the magnetic particles by addition of hydrochloric acid, (2) separation of the resulting flocculated particles, and (3) redispersion of the flocculated particles by addition of an aqueous suspension of ammonia, preferably with heating.

5 Claims, No Drawings

CONCENTRATING AND RECLAIMING MAGNETIC FLUIDS

This invention relates to concentration and/or reclaiming of magnetic fluids of the type disclosed in U.S. Pat. No. 4,208,294. These fluids comprise aqueous dispersions of magnetic particles, said dispersions being stabilized by the presence of a $C_{10}$ to $C_{15}$ fatty acid. As disclosed in the patent, these fluids have been found to exhibit unusual dilution stability. However, use of the fluids for gravity separation of minerals, scrap metals, solid wastes, etc., often results in separated solids, particles of which are coated with the fluid. Subsequent washing of the solids yields a very dilute aqueous suspension of the magnetic particles, which requires a high degree of concentration in order to regenerate magnetic fluid of suitable concentration. In addition, industrial processes and applications, such as printing with magnetic inks, magnetic domain location, sealing and lubrication, often result in dilution of the fluid beyond the desired concentration.

It has now been found, according to the present invention, that magnetic particles from such dilute suspensions may be readily flocculated by addition of hydrochloric acid, and that the resulting curd-like flocculent, which is believed to consist of an aggregation of the magnetic particles coated with the $C_{10}$–$C_{15}$ fatty acid, may be readily separated from the clear supernatant aqueous phase. Furthermore, it has been found that this material is readily redispersed in essentially any desired concentration by addition of an aqueous suspension of ammonia, preferably followed by heating of the mixture to facilitate dispersion of the flocculated material in the aqueous suspension. This results in reconstitution of the magnetic fluid in the desired concentration, and with magnetic properties at least as good as those of the original fluid. Thus, concentration or reclaiming of the fluids is readily achieved by means of a process that is both simple and efficient.

As discussed in said U.S. Pat. No. 4,208,294, the magnetic fluids with which the present invention is concerned consist essentially of aqueous suspensions of magnetic particles, the suspension being stabilized by the presence of one or more $C_{10}$–$C_{15}$ fatty acids. These fatty acids include decanoic, undecanoic, dodecanoic, tridecanoic, tetradecanoic and pentadecanoic acids, with dodecanoic acid generally being preferred. The preferred magnetic particles usually consist of iron oxides, particularly magnetite, although other magnetic particles, such as mixed oxides of cobalt or nickel and iron, may also be used.

Optimum concentration of the magnetic particles in the aqueous dispersion may vary widely depending on the specific magnetic particles and the intended use of the fluid. Generally, however, concentrations will range from about 75 to 450 grams/liter. Concentrations of the fatty acid will, of course, be that required to provide a stable suspension of the magnetic particles, and may vary from about 25 to 150 grams/liter.

The method of the present invention is applicable to a wide range of fluid compositions, and concentrations of magnetic particles therein. However, it has been found to be particularly applicable to very dilute suspensions, of the type discussed above, in which the concentration of magnetic particles in the suspension may vary from about 0.1 to 5 grams/liter.

In the initial phase of applicants' process, flocculation of the magnetic particles in dilute aqueous suspensions is readily accomplished by addition, with admixing, of hydrochloric acid to the suspension. Concentration of the added hydrochloric acid is not critical, but will usually be between about 1 and 6 molar. The amount of acid added is, of course, the amount required to effect essentially complete flocculation of the magnetic particles. This amount will depend on the type, amount and concentration of the magnetic particles, as well as the particular fatty acid dispersing agent employed, and is best determined experimentally.

As mentioned above, the resulting flocculent settles readily, and is easily removed from the essentially clear supernatent aqueous phase by conventional means such as decantation or filtration. It is then redispersed, in accordance with the second phase of the process, by addition of an aqueous solution of ammonia in an amount sufficient to procvide the desired concentration of magnetic particles in the resulting aqueous dispersion. Concentration of the ammonia solution is not critical, with optimum concentrations depending on the above-mentioned variables, as well as the amount of hydrochloric acid employed for flocculation of the magnetic particles. Generally, however, suitable concentrations of ammonia will range from about 2 to 10 percent. Further additions of fatty acid stabilizing agent are generally not necessary since sufficient amounts of the acid remain with the flocculated magnetic particles.

Although the flocculent can usually be redispersed in the aqueous ammonia solution simply by admixing, dispersion is greatly facilitated by heating the solution to a suitable temperature, e.g., about 80° to 100° C. Heating of the solution to boiling is generally preferred, and results in rapid and stable redispersion of the magnetic particles in the aqueous suspension.

The invention will be more specifically illustrated by the following examples.

EXAMPLE 1

A 100-ml volume of 180 gauss water-base magnetic fluid using a lauric acid dispersing agent was prepared by the method described in U.S. Pat. No. 4,208,294. A 50 percent solution of HCl was then added by stirring until the mixture was slightly acidic (pH $\sim$6). The addition of the acid caused the iron oxide to flocculate leaving a clear solution above the flocculent. After filtration, the resulting flocculent was mixed with 45 ml of water and 5 ml of concentrated $NH_4OH$. This mixture was heated to boiling and yielded 59 ml of magnetic fluid with a saturation magnetization of 255 gauss.

EXAMPLE 2

Fifty ml of 173 gauss magnetic fluid was mixed with 450 ml of water to simulate the washer discharge from a density separation system. The saturation magnetization of the dilute fluid was 17 gauss. HCl was then added to acidify the mixture and cause flocculation of the magnetic material. A No. 4 Whatman filter paper was used to vacuum filter the flocculent from the clear solution. The wet filter cake was then mixed with a small quantity of $NH_4OH$ ($\sim$5 ml) and the mixture was heated to boiling. The resulting fluid volume was 40 ml and its magnetization was measured as 200 gauss. Again, the new fluid is even stronger than the original one.

We claim:

1. A method for concentrating a dilute dispersion of magnetic particles in water, said dispersion having a concentration of magnetic particles of about 0.1 to 5 grams per liter and having been formed by dilution of a saturated fatty acid-stabilized magnetic fluid, consisting essentially of:

(a) adding hydrochloric acid to the dilute dispersion in an amount sufficient to flocculate the magnetic particles, (b) separating the flocculated magnetic particles from the supernatant liquid, and (c) admixing the flocculated magnetic particles with an aqueous ammonia solution of a concentration, and in an amount, sufficient to redisperse the magnetic particles and form a magnetic fluid having the desired concentration of magnetic particles.

2. The method of claim 1 in which the magnetic particles consist essentially of iron oxide.

3. The method of claim 1 in which the fatty acid is dodecanoic acid.

4. The method of claim 1 in which the redispersion of the flocculated magnetic particles is facilitated by heating.

5. The method of claim 4 in which the solution is heated to boiling.

* * * * *